United States Patent [19]

O'Brien

[11] 4,043,981

[45] Aug. 23, 1977

[54] COPOLYESTERS DERIVED FROM ETHOXYLATED 3,5-DIBROMO-4-HYDROXYBENZOIC ACID

[75] Inventor: William L. O'Brien, Cincinnati, Ohio

[73] Assignee: Emery Industries, Inc., Cincinnati, Ohio

[21] Appl. No.: 655,780

[22] Filed: Feb. 6, 1976

[51] Int. Cl.² .............................................. C08G 63/68
[52] U.S. Cl. ............................. 260/47 C; 260/75 H; 260/869
[58] Field of Search ................... 260/75 H, 869, 47 C

[56] References Cited

U.S. PATENT DOCUMENTS

| 3,873,504 | 3/1975 | Boettcher et al. | 260/47 C |
| 3,966,682 | 6/1976 | Nelson et al. | 260/75 H |
| 3,980,619 | 9/1976 | Sauer | 260/75 H |

*Primary Examiner*—Lucille M. Phynes
*Attorney, Agent, or Firm*—Gerald A. Baracka; John D. Rice

[57] ABSTRACT

Flame retardant high molecular weight linear copolyesters capable of being formed into fibers and filaments and which exhibit a high degree of thermal and ultraviolet stability are obtained using ethoxylated 3,5-dibromo-4-hydroxybenzoic acid.

7 Claims, No Drawings

COPOLYESTERS DERIVED FROM ETHOXYLATED 3,5-DIBROMO-4-HYDROXYBENZOIC ACID

BACKGROUND OF THE INVENTION

The use of hydroxybenzoic acids for the preparation of polyesters and copolyesters is known. For example, U.S. Pat. No. 2,600,376 shows the preparation of polyesters of m- and p-hydroxybenzoic acid. Copolyesters are similarly obtained employing hydroxyaromatic dibasic acids, such as 2-hydroxy- terephthalic acid, in U.S. Pat. No. 3,887,468. β-Oxyethoxy vanillic acid is used for the production of copolyesters in U.S. Pats. No. 3,056,761 and 3,288,755.

It is also well known to use halogenated (either chlorine or bromine) reactants for the preparation of polyesters and copolyesters having improved flame retardant properties. Numerous halogenated compounds containing hydroxyl and/or carboxyl functionality have been suggested for this purpose. U.S. Pat. No. 3,752,867, for example, discloses fireproof unsaturated polyester resins containing halogenated salicyclic acid. Fire-resistant unsaturated polyesters derived from bromine-containing compounds such as 3,5-dibromo-4-hydroxybenzoic acid are also disclosed in Japanese Pat. No. 74 11,875.

Even though it is recognized that brominated hydroxy and carboxy compounds are effective flame retardants for polyesters there are serious drawbacks associated with the use of such brominated derivatives in the preparation of high molecular weight polyesters useful as fibers and filaments because of the high polymerization temperatures (generally in excess of 250° C and often as high as 320° C) required. At these high temperatures most brominated materials tend to decompose and thus impart undesirable discoloration and, in some instances where the decomposition is pronounced, significantly detract from the overall physical properties of the polymer. Brominated compounds have therefore typically been limited to use in the preparation of unsaturated polyesters resins where much lower reaction temperatures (typically less than 200° C) are encountered.

SUMMARY OF THE INVENTION

I have now quite unexpectedly discovered that certain ethoxylated brominated derivatives of p-hydroxybenzoic acid are useful for the preparation of high molecular weight copolyesters. The resulting flame retardant copolyesters are useful in the formation of fibers and filaments in addition to having other thermoplastic applications. These brominated derivatives do not interfere with polymer formation so that high molecular weight products having inherent viscosities of 0.4 and higher are readily obtained. The resulting copolyesters also exhibit a high degree of thermal and ultraviolet stability. The copolyesters contain from about 1 to about 30% by weight of an ethoxylated brominated p-hydroxybenzoic acid corresponding to the structural formula

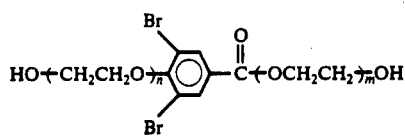

wherein $n$ and $m$ are integers from 1 to 3. Copolyesters obtained with diethoxylated 3,5-dibromo-4-hydroxybenzoic acid, i.e. when $n = m = 1$, form an especially preferred embodiment of this invention. The ethoxylated dibrominated hydroxybenzoic acid is readily reacted into the polyester and capable of withstanding temperatures encountered during final stages of the polymerization so that the resulting copolyester products have good color and physical properties. The ethoxylated brominated hydroxybenzoic acid may be added to the polymerizer as such or prepolymerized and the prepolymer used.

DETAILED DESCRIPTION

The present invention relates to the use of ethoxylated brominated p-hydroxybenzoic acid for the preparation of high molecular weight copolyesters. The resulting thermoplastic copolyester compositions are suitable for use as fibers, filaments and for numerous other applications and, in addition to being flame retardant, have excellant physical properties and exhibit a high degree of thermal stability and ultraviolet stability. The ethoxylated brominated hydroxybenzoic acids have the general formula

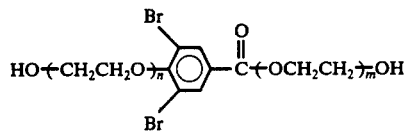

where $n$ and $m$ are integers from about 1 to 3. 3,5-Dibromo-4-hydroxybenzoic acid diethoxylate for the formula.

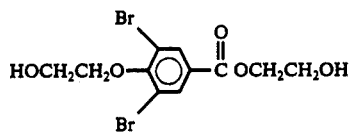

is preferred for the production of useful copolyesters. The ethoxylated brominated p-hydroxybenzoic acids are obtained using known reaction techniques. Conventional ethoxylation and bromination procedures can be employed for their preparation.

The copolyesters will generally contain about 1 to 30 weight percent of the ethoxylated brominated material, however, polymers having good physical properties and color and which exhibit a high degree of thermal and ultraviolet stability are obtained when about 10 to 25 weight percent, based on the total copolyesters composition, ethoxylated brominated p-hydroxybenzoic acid is present. Especially useful copolyesters contain from 10 to 25 weight percent of the 3,5-dibromo-4-hydroxybenzoic diethoxylate.

The ethoxylated brominated hydroxybenzoic acid may be used as such or can be polymerized and the prepolymer used for the preparation of the copolyester. The prepolymer will contain repeating units of the type copolyester. The prepolymer will contain repeating units of the type

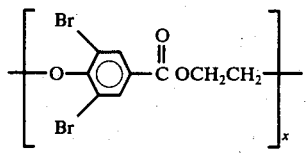

where x indicates the number of repeating units and generally ranges between about 2 and 200 and, more generally, between about 5 and 100. In general, the prepolymer will be treated and charged in the same manner as the monomer. Under the polymerization conditions the prepolymer generally depolymerizes so that moieties identical to those obtained using the monomer are randomly inserted in the copolyester. It is possible, however, to insert some block polymer segments under certain conditions when the prepolymer is used.

The ethoxylated brominated p-hydroxybenzoic acid or prepolymer can be reacted with a wide variety of aliphatic and alicyclic diols and aliphatic, alicyclic and aromatic dicarboxylic acids or esters to obtain useful high molecular weight thermoplastic copolyesters. Also, it is possible to react the ethoxylated brominated hydroxybenzoic acid or prepolymer thereof with a prepolymer of the diol and dicarboxylic acid, such as bis (2-hydroxyethyl) terephthalate.

In general, the useful glycols include the aliphatic (branched or straight chain) or alicyclic diols corresponding to the general formula HO—R—OH where R is a bivalent radical containing 2 to 10 carbon atoms. Useful diols include but are not limited to ethylene glycol, 1,3-propanediol, 1,4-butanediol, 1,6-hexanediol, 1,7-heptanediol, 1,8-octanediol, 1,10-decanediol, 1,4-cyclohexanedimethanol and the like. Useful dicarboxylic acids and their lower alkyl ($C_1$-$C_4$) esters include aliphatic (branched or straight-chain), alicyclic and aromatic dicarboxylic acids containing from about 4 to 12 carbon atoms and their esters. Such acids include but are not limited to terephthalic acid, isophthalic acid, adipic acid, sebacic acid, succinic acid, glutaric acid, pimelic acid, suberic acid, azelaic acid, cyclohexanedicarboxylic acid and the like. Methyl, ethyl, isopropyl and butyl esters of these acids can also be employed for the copolyester preparation. For example, terephthalic acid or dimethyl terephthalate can be used for the preparation of essentially identical linear copolyester products with ethylene glycol, 1,4-butanediol, or 1,4-cyclohexanedimethanol and 3,5-dibromo- 4-hydroxybenzoic acid diethoxylate. Mixtures of two or more diols or dicarboxylic acids (esters) can also be employed.

The present invention has particular advantage for the preparation of linear high molecular weight thermoplastic copolyesters obtained by the reaction of the ethoxylated brominated hydroxybenzoic acid, a diol selected from the group consisting of ethylene glycol, 1,4-butanediol and 1,4-cyclohexanedimethanol and terephthalic acid or a lower alkyl ester thereof. Particularly useful compositions include ethylene glycol/terephthalic acid (ester)/3,5-dibromo-4-hydroxybenzoic acid diethoxylate copolyesters; 1,4- cyclohexanedimethanol/terephthalic acid (ester)/3,5-dibromo-4-hydroxybenzoic acid diethoxylate copolyesters; and 1,4-butanediol/terephthalic acid (ester)/ 3,5-dibromo-4-hydroxybenzoic acid diethoxylate copolyester. These copolyesters are particularly important for use as engineering plastics and as fibers and filaments and have acceptable physical properties, color, fire resistance, thermal stability and ultraviolet stability. Preferred copolyester compositions of this invention are crystalline linear polymers which can be formed into fibers which have a high melt point, tensile strength, elongation and elastic recovery.

Small amounts of other monomers and/or additives can be incorporated into the copolyesters of this invention to further enhance their properties. To improve the disperse, small amounts of dibasic acids such as adipic acid, azelaic acid or dimer acid may also be included. Sulfonated isophthalic acid may be included to improve basic dyeing properties of the copolyester. To enhance the flame retardant properties other brominated materials, such as brominated ethoxylated bisphenol A and other aromatic brominated diols, or diacids, can be included in the reactant charge and incorporated into the copolyester. Antimony oxide or various phosphorus-containing compounds (e.g. triphenyl and tricresyl phosphate) are also useful additives for this purpose. Antimony oxide in amounts up to one gram atom per three gram atoms of bromine have been found to enhance the self-extinguishing properties conferred by the ethoxylated brominated p-hydroxy- benzoic acid. The amounts of such reactants and additives will generally range from about 0.1 to 10% by weight of the copolyester, and more preferably, constitute about 0.3 to 4% by weight.

Conventional polymerization procedures are used for the production of these copolyesters to react the brominated ethoxylated compound with the diol and diacid or its ester. The various procedures employed as well as reaction conditions and catalysts are described in the art. The polymerization can be conducted as a batch or semi-continuous process and the reactants may be charged as such or prepolymers employed. 3,5-Dibromo-4-hydroxybenzoic acid ethoxylate or a prepolymer thereof may be added to the polymerizer at the outset of the reaction or at some intermediate stage but before the finishing step. Numerous modifications of the process are possible including variation of the reactants, catalyst, reaction temperature and pressure, ratio of reactants, manner in which the reactants are charged, physical arrangement of the equipment and the like, as will be evident to those skilled in the art.

The following examples illustrated the invention more fully, however, they are not intended to limit the scope thereof, In these examples, all parts and percentages are reported on a weight basis unless otherwise indicated.

EXAMPLE I

Preparation of 3,5-dibromo-4-hydroxybenzoic acid diethoxylate: One-hundred and thirty-eight parts p-hydroxybenzoic acid was combined with 75 parts glacial acetic acid and heated on a steam bath at 80° C with stirring. When solution was complete 120 parts bromine was added dropwise over a period of about two hours. The reaction mixture was then cooled and filtered and the solid product washed with water until the filtrate was neutral. A 93% yield of 3,5-dibromo-4-hydroxybenzoic acid (acid value 378; neutral equivalent 149) melting at 270°–272° C with gas evolution was obtained.

Six parts of the 3,5-dibromo-p-hydroxybenzoic acid was combined with 34 parts ethyl acetate and 0.3 wt. % triethylamine catalyst in a stirred autoclave. The system was purged several times by applying a vacuum to the system and then breaking with dry nitrogen. The reactor and its contents were then heated to about 95° C and ethylene oxide addition begun. The ethylene oxide was charged incrementally in amounts sufficient to achieve a pressure of about 25 psig (maximum pressure developed was 30 psig). As the pressure dropped additional ethylene oxide was charged until 1.95 parts (slight excess due to loss during sampling) ethylene oxide had been charged. When the acid value of the reaction mixture reached 1.0 (total reaction time about 30 hours) the reaction was terminated by cooling and venting unreacted ethylene oxide. Upon standing overnight, about one-half the theoretical amount of the diethoxylate crystallized. This product melted at 106°–107° C and had zero acid value with a hydroxyl number of 290. The structure was confirmed by nuclear magnetic resonance spectroscopy. By removing approximately one-half of the ethyl acetate originally present from the mother liquor, additional product was obtained so that the total yield of 3,5-dibromo-4-hydroxybenzoic acid diethoxylate was approximately 90°.

EXAMPLE II

To prepare a copolyester, 2000 grams dimethyl terephthalate and 1400 grams ethylene glycol were combined with 0.3 gram zinc acetate and reacted at 200° C to prepare a prepolymer, bis(2-hydroxyethyl)terephthalate. After the theoretical amount of methanol (836 mls.) was removed from the reaction mixture (about 5 hours) the reaction was terminated by deactivating the catalyst by the addition of 0.04% trisnonylphenyl phosphate. The prepolymer was recovered for subsequent use.

Fifty grams of the bis(2-hydroxyethyl)terephthalate prepolymer was combined with 14 grams 3,5-dibromo-4-hydroxybenzoic acid diethoxylate and 25 milligrams antimony trioxide catalyst. The reactants were melted under a nitrogen atmosphere by heating at about 225° C. The temperature was increased to about 290° C and a vacuum applied to the system at about 275° C. After one hour when the temperature was about 285° C the pressure was reduced to 0.25 mmHg and the polymerization completed (total polymerization time 1 ¾ hours). The solid copolyester product containing 10 wt. percent bromine was transparent and had an inherent viscosity of 0.44 (determined by dissolving about 0.1 gram sample of the polymer in 20 grams solvent — a mixture of 40 parts s-tetrachloroethane and 60 parts phenol). Inherent viscosity $[\eta]_{inh}$ is an approximation of intrinsic viscosity, which is in turn a parameter of average molecular weight. It is defined as the natural logarithm of the relative viscosity (flow time of polymer solution/flow time of equal volume of solvent) divided by the polymer concentration in grams/dl. The dimensions of $[\eta]_{inh}$ are dl/g. Recommended ASTM nomenclature is logarithmic viscosity number. Intrinsic viscosity $[\eta]$ or limiting vis number is obtained by determining $[\eta]_{inh}$ at several concentrations, usually 0.05–0.5 g/dl, and extrapolating to zero concentration. For most polymer-solvent systems $[\eta] \sim 1.05$–$1.1$ $[\eta]_{inh}$, and common practice equates $[\eta]_{inh, c=0.5}$ with $[\eta]$. An average molecular weight is obtained from the expression $[\eta] = K'\overline{M}_v{}^a$ where $K'$ and $a$ are constants obtained from log-log plots of $[\eta]$ against molecular weight for known polymers in solution. Compilations of $K'$ and $a$ for various polymer-solvent systems are widely available.

Fibers and filaments of copolyesters containing the 3,5-dibromo-4-hydroxybenzoic acid diethoxylate are obtained using conventional procedures such as melt extrusion. These copolyester fibers can be orientated by drawing and they can be heat set by heating the elongated fiber. The fibers have excellent physical properties and can be employed in conventional applications and can be used in any state of aggregation such as monofilaments, flocks, yarns, tows or cords. They are readily knitted or woven and can be used in textile applications by themselves or in blends containing about 25–65% by weight of the copolyester and 75–35% by weight of another fiber such as cotton, nylon or another opolyester. Extremely useful blends are obtained when the copolyesters of this invention are blended with cotton. Blends with fibers having elastic properties to obtain stretch fabics can also be prepared.

EXAMPLE III

Employing a procedure similar to that described in Example II, 37 grams bis(2-hydroxyethyl)terephthalate prepolymer and 3.8 grams 3,5-dibromo-4-hydroxybenzoic acid diethoxylate were polymerized using 40 milligrams antimony triacetate catalyst. The resulting copolyester product contained 5.5% bromine and had an inherent viscosity of 0.53. The copolyester had good clarity with essentially no discoloration. The product had good flame retardant properties, thermal stability and ultraviolet stability.

EXAMPLE IV

To a glass polymerization tube were charged 12.7 grams bis(2-hydroxy-ethyl) terephthalate prepolymer, 25 milligrams antimony trioxide and 5 mls. ethylene glycol. The tube and its contents were heated in a methyl salicylate bath and 38.4 grams 3,5-dibromo-4-hydroxybenzoic acid diethoxylate then added and heating continued in a diethylene glycol bath. A vacuum was then applied and heating continued for an hour. The highly viscous polymer melt had good color and the copolyester contained 36.5% by weight bromine upon analysis.

EXAMPLE V

A prepolymer of the diethoxylate of Example I was prepared by polymerizing 100 grams 3,5-dibromo-4-hydroxybenzoic acid diethoxylate using 50 milligrams antimony trioxide catalyst. Polymerization was accomplished by heating the reaction mixture (maximum temperature 248° C) for about 1½ hours. The resulting opaque solid prepolymer contained 45.6% bromine and had a melting point of 259° C as determined by differential scanning calorimetry. A copolyester was prepared by combining the prepolymer (7 grams) with 50 grams bis(2-hydroxyethyl) terephthalate prepolymer, 10 mls ethylene glycol and 25 milligrams antimony trioxide. The polymerization was conducted for about 4 hours at a maximum temperature of 274° C. A high molecular weight copolyester was obtained as evidenced by shattering of the polymerization tube upon cooling the highly viscous polymer melt. The copolyester contained 6.6% bromine, had good flame retardant properties and exhibited a high degree of thermal and ultraviolet stability.

To demonstrate the utility of the products of this invention copolyesters as prepared above were evaluated for their flammability, thermal stability and stability upon exposure to ultraviolet radiation. Thermal stabilities of the copolyester products of Examples II and III were determined by thermal gravimetric analysis by heating a sample of each copolyester in a nitrogen atmosphere with a flow of 70 mls nitrogen per minute while the temperature was increased at a rate of 10° C per minute and observing the temperature at which initial decomposition occurred and thereafter measuring the weight loss due to decomposition as a function of time. These copolyesters had excellent thermal stability. Initial decomposition of the copolyesters was not observed until the temperature reached 350° C.

Flame retardance was determined with a General Electric Flammability Index Tester in accordance with the oxygen index test method (ASTM D 2863-70). The oxygen index is the minimum concentration of oxygen in a mixture of oxygen and nitrogen that will support combustion of a sample. The higher the oxygen index the better the flame retardancy. Samples were prepared by placing 5.5 grams of the copolyester and a 1 × 8 cm. fiberglass strip in a heavy aluminum foil mold and placing on a hot plate until the copolyester was melted. After cooling the test specimens were clamped in an upright position at the bottom of a vertical glass chimney and ignited at the upper end with a flame. The oxygen/nitrogen mixture was passed through the chimney and if the sample continued to burn the oxygen content of the mixture was reduced and the process repeated until the mixture no longer supported combustion. The oxygen index rating was then calculated as follows:

$$\frac{(O_2 \text{ Volume}) \times 100}{(O_2 \text{ Volume}) + (N_2 \text{ Volume})}$$

The average of about four samples was reported. Whereas the oxygen index of polyethylene terephthalate was 21.1, a copolyester (6.7% Br) obtained in accordance with this invention from 3,5-dibromo-4-hydroxybenzoic acid diethoxylate had an oxygen index of 23.8 Similar improvement in flame retardance is also obtained with polybutylene terephthalate copolyesters having a comparable bromine content. The addition of 0.5 to 2% by weight antimony oxide to the copolyesters derived from the ethoxylated brominated hydroxybenzoic acid, terephthalic acid (or methyl ester) and ethylene glycol or 1,4-butanediol further enhances the flame retardant properties of the thermoplastic products.

Ultraviolet stability was determined by finely pulverizing the copolyester and depositing the powder on glass plates whose surface was coated with a thin layer of non-yellowing adhesive binder. The glass plates were then exposed to ultraviolet radiation for 50 hours in a Fade-O-Meter. At the end of this period the samples were visually examined for discoloration and assigned visual index numbers from 1 to 5 (higher numbers indicting increased discoloration). Copolyester products (6.5 wt. % Br) obtained in accordance with this invention from both the 3,5-dibromo-4-hydroxybenzoic acid diethoxylate monomer and a prepolymer thereof (Example V) had index ratings of 2. This compared favorably with the polyethylene terephthalate control containing no flame retardant additive which had an index rating of 1. Copolyesters having the same weight percent bromine but obtained using other aromatic brominated flame retardant additives, namely 2,5-dibromoterephthalic acid and 1,4-di(2-hydroxyethoxy)-2,5-dibromobenzene showed appreciably more discoloration and were assigned index ratings of 4.

Copolyesters obtained by the present invention may be treated in accordance with known procedures for working, handling and modifying polyester thermoplastic materials. While the copolyesters may be used without further compounding, known additives such as stabilizers, lubricants, plasticizers, delusterants, dyes, pigments, antistatic agents and the like may be incorporated therein. These copolyesters may also be blended with other polymers and the like. Additives may be incorporated using conventional mixing equipment such as a Banbury mixer, revolving drum or sigma blade mixer and they generally do not require special processing or handling. They may be mixed with the copolyester in dry form or dispersed or dissolved in suitable solvents. In some instances, it may be advantageous to prepare a master batch of the various additives for blending with the copolyester. The incorporation of additives and modifying agents is most advantageously accomplished by melt blending. In this way the additives are readily and uniformly dispersed in the copolyester.

I claim:
1. A flame retardant copolyester having improved thermal and ultraviolet stability comprising the condensation product of
   a. an aliphatic or alicyclic diol having from 2 to 10 carbon atoms,
   b. an aliphatic, alicyclic or aromatic dicarboxylic acid having from 4 to 12 carbon atoms or lower allkyl esters thereof, and
   c. ethoxylated brominated hydroxybenzoic acid of the formula

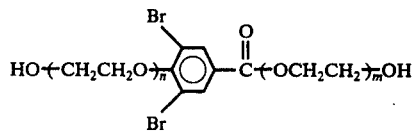

where n amd m are integers from 1 to 3,
said ethoxylated brominated hydroxybenzoic acid comprising about 1 to 30% by weight of the copolyester composition.

2. The copolyester of claim 1 further characterized as a high molecular weight crystalline linear polymer having an inherent viscosity greater than 0.4.

3. The copolyester of claim 1 wherein (c) is diethoxylated 3,5-dibromo- 4-hydroxybenzoic acid having $n = m = 1$.

4. The copolyester of claim 3 wherein (b) is terephthalic acid or dimethylterephthalate and (c) constitutes 10 to 25% by weight of the copolyester composition.

5. The copolyester of claim 4 wherein (a) is ethylene glycol.

6. The copolyester of claim 4 wherein (a) is 1,4-butanediol.

7. The copolyester of claim 4 wherein (a) is 1,4-cyclohexanedimethanol.

* * * * *